(12) United States Patent
Sana et al.

(10) Patent No.: US 9,409,361 B2
(45) Date of Patent: Aug. 9, 2016

(54) MOLD, MOLDING JIG AND MOLDING METHOD

(75) Inventors: Toshikazu Sana, Kakamigahara (JP); Akihito Sakai, Gifu (JP); Akira Murai, Minokamo (JP); Yasuhiro Takenaka, Anpachi-gun (JP); Kazuyoshi Kawano, Hashima-gun (JP); Tomoya Takahashi, Ibi-gun (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 355 days.

(21) Appl. No.: 13/976,732

(22) PCT Filed: Dec. 26, 2011

(86) PCT No.: PCT/JP2011/007255
§ 371 (c)(1),
(2), (4) Date: Sep. 24, 2013

(87) PCT Pub. No.: WO2012/090468
PCT Pub. Date: Jul. 5, 2012

(65) Prior Publication Data
US 2014/0008009 A1  Jan. 9, 2014

(30) Foreign Application Priority Data

Dec. 27, 2010 (JP) ................................. 2010-290401

(51) Int. Cl.
| | |
|---|---|
| *B29C 43/36* | (2006.01) |
| *B29C 70/32* | (2006.01) |
| *B29D 99/00* | (2010.01) |
| *B29C 33/00* | (2006.01) |
| *B29C 70/54* | (2006.01) |
| *B64F 5/00* | (2006.01) |

(52) U.S. Cl.
CPC .......... *B29D 99/001* (2013.01); *B29C 33/0011* (2013.01); *B29C 43/3642* (2013.01); *B29C 70/32* (2013.01); *B29C 70/543* (2013.01); *B29C 2043/3652* (2013.01); *B29C 2043/3655* (2013.01); *B64F 5/0009* (2013.01); *Y02T 50/433* (2013.01); *Y10T 156/103* (2015.01)

(58) Field of Classification Search
CPC .............. B29C 70/543; B29C 33/0011; B29C 2043/3652; B29C 2043/3655
See application file for complete search history.

(56) References Cited

U.S. PATENT DOCUMENTS

| | | | | |
|---|---|---|---|---|
| 6,298,896 | B1 * | 10/2001 | Sherrill et al. ................. | 156/581 |
| 8,057,206 | B1 * | 11/2011 | McKnight ........... | B29C 33/0011 249/161 |
| 8,980,039 | B2 * | 3/2015 | Boyeldieu ........... | B29C 33/0011 156/245 |
| 2008/0230652 | A1 | 9/2008 | Biornstad et al. | |

(Continued)

FOREIGN PATENT DOCUMENTS

| | | | | |
|---|---|---|---|---|
| FR | WO 2009095619 A2 * | 8/2009 | .......... | B29C 33/0011 |
| JP | 2-162016 A | 6/1990 | | |

(Continued)

*Primary Examiner* — William Bell
(74) *Attorney, Agent, or Firm* — Sughrue Mion, PLLC

(57) ABSTRACT

A mold (10) according to the present invention is a mold for molding a surface of a laminate (60) when curing the laminate (60) obtained by laminating prepreg (62). The mold (10) has a planar plate shape and elastically deforms from the planar plate shape into a shape corresponding to a shape of the laminate (60), thereby being capable of coming tight into contact with the laminate (60). Thereby, a mold which is easy to handle can be provided.

7 Claims, 5 Drawing Sheets

(56) References Cited

U.S. PATENT DOCUMENTS

| | | | | |
|---|---|---|---|---|
| 2008/0251975 | A1* | 10/2008 | Gallagher | B29C 33/0011 264/571 |
| 2008/0302500 | A1* | 12/2008 | Winkler | G05B 19/4099 164/45 |
| 2009/0081410 | A1* | 3/2009 | Albertson | B29C 70/44 428/137 |
| 2009/0297788 | A1* | 12/2009 | Dull | B29C 70/446 428/189 |
| 2013/0340927 | A1* | 12/2013 | Schuermann | B29C 33/02 156/212 |

FOREIGN PATENT DOCUMENTS

| | | |
|---|---|---|
| JP | 3-292131 A | 12/1991 |
| JP | 7-088968 A | 4/1995 |
| JP | 2007-015351 A | 1/2007 |
| JP | 2008-184156 A | 8/2008 |
| JP | 2009-035001 A | 2/2009 |
| JP | 2009-526697 A | 7/2009 |
| JP | 2009-191092 A | 8/2009 |
| WO | 2007/093636 A1 | 8/2007 |

* cited by examiner

MOLD, MOLDING JIG AND MOLDING METHOD

CROSS REFERENCE TO RELATED APPLICATIONS

This application is a National Stage of International Application No. PCT/JP2011/007255 filed Dec. 26, 2011, claiming priority based on Japanese Patent Application No. 2010-290401 filed Dec. 27, 2010, the contents of all of which are incorporated herein by reference in their entirety.

TECHNICAL FIELD

The present invention relates to a mold for molding a surface of a composite material molded article, a molding jig including the mold, and a molding method using the mold.

BACKGROUND ART

A skin of a fuselage of an aircraft is formed of a thin member called a skin panel (for example, refer to Patent Document 1). In recent years, a technology for integrally forming a broader skin panel than before with using fiber-reinforced resin composite materials (hereinafter, simply referred to as "composite materials") has been developed. For example, even though a skin panel in the vicinity of the center of the fuselage of a large aircraft has a cylindrical shape, the technology integrally forms a seamless skin panel of a cylindrical shape.

In order to manufacture the skin panel of a cylindrical shape described above, multiple sheets of prepreg, each being prepared by impregnating textiles, such as carbon fiber, with semi-cured thermosetting resin (epoxy resin, etc.), are laminated to be formed into a cylindrical shape (hereinafter, one obtained by laminating multiple sheets of prepreg is referred to as a "laminate"), and the laminate is then put under pressure and heat so as to be cured. At this time, it is important to perform the curing in a state in which the surface of the laminate is kept in tight contact with a mold (generally called "curl plate" or "cowl plate") having a smooth surface so that a product, produced as a result of the curing, would have a smooth surface. This is because an outside surface of the skin panel comes into contact with an air current, and requires high smoothness.

PRIOR ART DOCUMENT

Patent Document

Patent Document 1: PCT Application Publication No. 2009-526697

SUMMARY OF THE INVENTION

Problems to be Solved by the Invention

As a mold used in the molding method described above, a mold of a reversal shape which is the reverse of the shape of the periphery of the skin panel, i.e., a mold having an inner surface of a circular sectional shape is used. However, since the skin panel of a large aircraft has a considerably large diameter of 5 to 10 m, it is substantially impossible to mold the skin panel with a single mold. Therefore, actually, a plurality of molds each having an inner surface of a circular-arc sectional shape (i.e., the shape of a partial circle in section) is assembled and attached to the entire perimeter of the laminate (skin panel).

However, this mold has not been probably easy to handle for the following reasons. That is, the mold is not only heavy but also has to be horizontally maintained while it is being attached to the laminate. Therefore, it is necessary to use a large-sized apparatus and a retaining jig for maintaining a horizontal balance. Furthermore, since adjacent molds easily tend to interfere with each other, positioning work is not easy. Since the molds cannot be stored in piles, even with simple consideration, a large storage space of about an area the same as a developed area of the skin panels is needed.

The present invention was made to solve the above-mentioned problems and an object thereof is to provide a mold which is easy to handle.

Solutions to the Problems

The present invention was made to solve the above problems. A mold according to the present invention is a mold used for molding a surface of a laminate when curing the laminate obtained by laminating prepreg. The mold has a planar plate shape and elastically deforms from the planar plate shape into a shape corresponding to the shape of the laminate so that the mold can come into tight contact with the laminate. In accordance with this configuration, since the mold can be moved in a state in which an end of the mold is hung, installation work of the mold is easy. Since the mold can be stored in a standing position, a storage space may be suppressed to be small. Since the mold deforms within the range of elastic deformation, the mold can be repeatedly used.

The mold is preferably made of a fiber-reinforced plastic. In accordance with this configuration, since the range of elastic deformation is relatively wide compared with a case where the mold is made of metal, a degree of freedom in design is high. Furthermore, since the mold is not likely to undergo local deformation, durability may also increase.

The mold preferably has a thickness of 1.5 mm±0.5 mm. In accordance with this configuration, the mold may have a minimum requisite rigidity for molding a surface of the laminate even while having a degree of flexibility at which the mold can come into tight contact with the surface of the laminate.

A molding jig according to the present invention includes the mold, and a retaining mechanism which causes the mold to be kept in tight contact with the laminate.

In the molding jig, the retaining mechanism may include a retaining belt which is stretched and fastenable over an outside surface of the mold and can tightly fasten the mold, and a plurality of spacers interposed between the retaining belt and the mold. In accordance with this configuration, since the plurality of spacers can apply a perpendicular force to the mold by tightly fastening the retaining belt, the mold can be kept in tight contact with the laminate.

In the molding jig, the plurality of spacers includes spacers which differ in height, the laminate has a cylindrical shape, and when the retaining belt is stretched in an axial direction of the laminate, each spacer included in the plurality of spacers may be arranged in an ascending order of height toward a center of the retaining belt. In accordance with this configuration, even in the vicinity of the center of the retaining belt at which it is difficult to apply a perpendicular force to the mold, it is possible to apply a sufficient force to the mold, and a force variation in the axial direction can be suppressed to be small.

As another form, in the molding jig, sheets of prepreg may be laminated on a core die serving as a magnetic body, and the retaining mechanism may include a plurality of retaining magnets that generates magnetism and can be absorbed onto the core die via the mold and the laminate. In accordance with this configuration, since the plurality of retaining magnets can apply a perpendicular force to the mold, the mold can be kept in tight contact with the laminate.

In the molding jig, the retaining magnets may be configured to generate strong magnetism from only one surface. In accordance with this configuration, since the magnetism which is generated by the retaining magnets can act only in a direction toward the mold, the retaining magnets can apply a sufficient force to the mold without influencing another retaining magnet and the like.

A molding method according to the present invention includes a laminating step of forming a laminate by laminating prepreg, a coating step of bringing a flexible mold of a planar plate shape into tight contact with the laminate while deforming the flexible mold into a shape corresponding to a shape of the laminate, and a curing step of curing the laminate in a state in which the mold is kept in tight contact with the laminate. In accordance with this method, the coating step of bringing the mold into tight contact with the laminate can be easily performed.

In the molding method, in the coating step, the mold may be brought into tight contact with the laminate by stretching a retaining belt over an outside surface of the mold, arranging a plurality of spacers between the retaining belt and the mold, and tightly fastening the retaining belt. In accordance with this method, since the plurality of spacers can apply a perpendicular force to the mold by tightly fastening the retaining belt, the mold may be kept in tight contact with the laminate.

In the molding method, the laminate may have a cylindrical shape, and in the coating step, the retaining belt may be stretched in an axial direction of the laminate and the plurality of spacers may be arranged in an ascending order of height toward a center of the retaining belt. In accordance with this method, even in the vicinity of the center of the retaining belt at which it is difficult to apply a perpendicular force to the mold, it is possible to apply a sufficient force to the mold, and a force variation in the axial direction can be suppressed to be small.

As another form, in the molding method, sheets of the prepreg are laminated on a core die serving as a magnetic body, and in the coating step, a plurality of retaining magnets which generates magnetism may be absorbed onto the core die via the mold and the laminate so that the mold may be brought into tight contact with the laminate. In accordance with this method, since the plurality of retaining magnets can apply a perpendicular force to the mold, the mold may be brought into tight contact with the laminate.

In the molding method, the laminate may have a cylindrical shape, and in the coating step the plurality of retaining magnets is arranged uniformly in an axial direction of the mold as well as uniformly in a circumferential direction of the mold. In accordance with this method, a perpendicular force to the mold may be applied uniformly in the axial direction and the circumferential direction by the plurality of retaining magnets.

In the molding method, in the coating step, when bringing the mold into tight contact with the entire perimeter of the laminate, work of bringing the mold into tight contact with the laminate always from a side of the laminate may be performed by rotating the laminate. In accordance with this method, the coating step can be more safely performed compared with a case, for example, where work is performed from a top side of the laminate.

Effects of the Invention

In accordance with a mold according to the present invention, as described above, since the mold can be moved in a state in which an end of the mold is hung, installation work of the mold is easy. Since the mold can be stored in a standing position, a storage space may be suppressed to be small. That is, according to the present invention, a mold which is easy to handle can be provided.

EMBODIMENTS OF THE INVENTION

Figure 1:
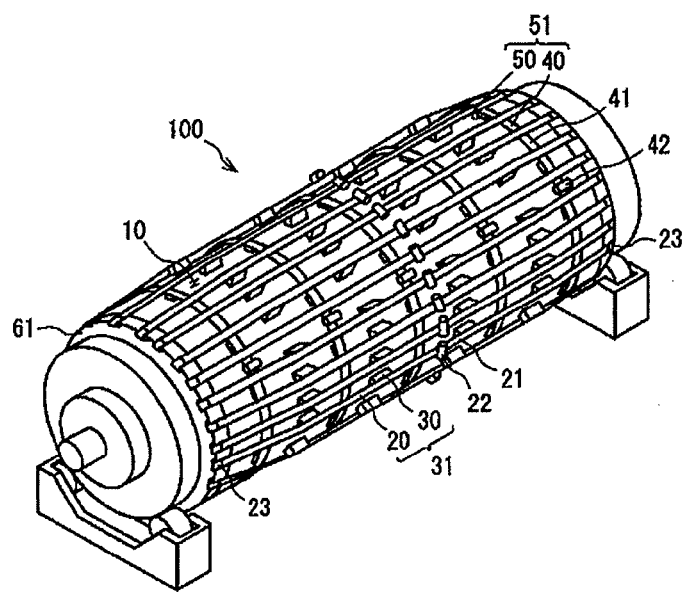
FIG. 1 is a diagram showing an installed state of a molding jig according to a first embodiment of the present invention.

Hereinafter, embodiments of a molding jig and a molding method according to the present invention will be described with reference to the drawings. Hereinafter, throughout the drawings, the same or corresponding components are designated by the same reference numerals and repetitive description thereof will not be given.

First Embodiment

First, a first embodiment of the present invention is described with reference to FIGS. 1 to 7.
<Configuration of Molding Jig>
First, the configuration of a molding jig 100 according to the present embodiment is described with reference to FIG. 1. The molding jig 100 according to the present embodiment is assumed to be used to mold a skin panel of a fuselage portion of a large aircraft. The skin panel is assumed to have a cylindrical shape having a diameter of about 6 m and an axial length of about 7 m. FIG. 1 is a perspective view showing a state in which the molding jig 100 according to the first embodiment is being used. As shown in FIG. 1, the molding jig 100 according to the present embodiment includes a mold 10, an axial direction retaining belt 20, axial direction spacers 30, a circumferential direction retaining belt 40, and circumferential direction spacers 50. Hereinafter, each of these components will be described in order.

Figure 2:
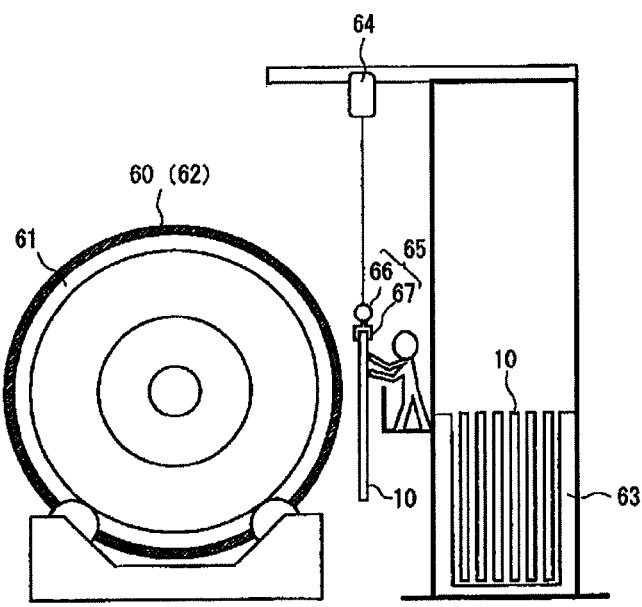
FIG. 2 is a diagram showing a portion of a coating step of a molding method according to the first embodiment of the present invention.
Figure 3:
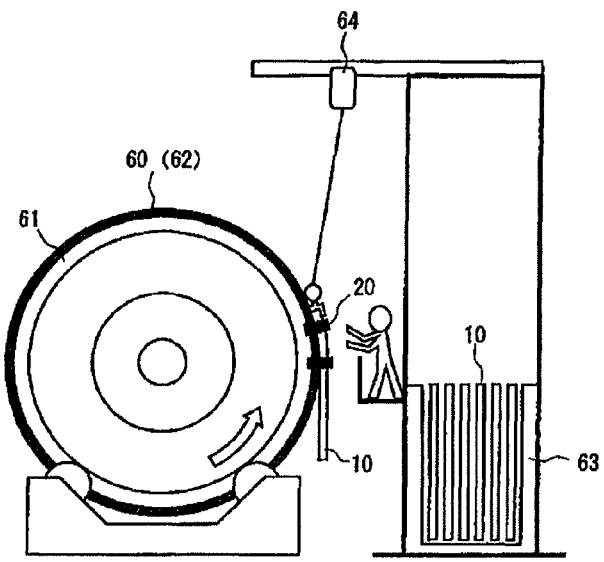
FIG. 3 is a diagram showing a portion of the coating step of the molding method according to the first embodiment of the present invention.

The mold 10 is a component for molding a surface of a laminate 60 by coming into tight contact with the laminate 60 (see FIGS. 2 and 3). Although the number of the molds 10 used is not limited to a particular number, seven sheets of molds 10 are used in the present embodiment. The mold 10 has a planar plate shape where a principle face is rectangular (see FIG. 2) and is about 7 m in width. The width is slightly smaller than an axial size of the laminate 60 having a redundant portion which is cut away after curing. A size obtained by adding longitudinal sizes of the seven sheets of molds 10 is slightly smaller than a size of an outer circumference of the laminate 60 so that the mold may not run on when the mold is set. In the present embodiment, the longitudinal sizes of each mold 10 slightly differ from each other but all are about 3 m. However, each mold 10 may be the same in the longitudinal size. The mold 10 has flexibility. Therefore, it can elastically deform, from the planar plate shape, into a shape corresponding to the shape (a part of a cylindrical shape) of the laminate 60 so as to be brought into tight contact with the laminate 60. Each mold 10 has the principal surface which is smooth, and is made of carbon fiber-reinforced plastics (hereinafter, referred to as "CFRP"). CFRP is used as a material because CFRP allows a high degree of freedom in design owing to a wide range of elastic deformation and durability increases owing to unlikelihood of local deformation.

Here, a manufacturing method of the mold 10 is described briefly. First, carbon fiber cross material-reinforced epoxy resin prepreg and carbon fiber one-way material-reinforced epoxy resin prepregs are alternately laminated in ten sheets on a surface plate. Subsequently, the laminated prepreg is enclosed in a vacuum bag and then vacuum suction is performed. In this state, the laminated prepreg is put under pressure and heat so as to be cured. Then, the cured prepreg is taken out of the vacuum bag and is cut into pieces with a predetermined size. Throughout these steps, the mold 10 is completed. The number of sheets of prepreg laminated, etc. as shown here is just examples, and is suitably changed based on the size and material of a skin panel as a to-be-molded target.

However, since the mold 10 performs the molding by restricting deformation of the laminate 60 while the laminate 60 (skin panel) is being cured, when rigidity of the mold 10 is high, it is possible to perform the molding with high precision. When flexibility is high, operability is good. However, the flexibility of the mold 10 is not the only factor that enables high precision in molding. In consideration of this point, when the to-be-molded target is a skin panel used for a fuselage of a large aircraft which has a diameter of 5 to 10 m and when the mold is made of CFRP, it is preferable that the mold 10 has a thickness of 1 mm or more. When the skin panel is about 6 m in diameter as in the present embodiment, an optimal thickness of the mold 10 is 1.5 mm±0.5 mm in order to manufacture the mold which is high in rigidity as well as has a flexibility at which the mold can be brought into tight contact with the surface of the skin panel (laminate 60).

The axial direction retaining belt 20 is a component, extending in the axial direction of the laminate 60, for bringing the mold 10 into tight contact with the laminate 60, and constitutes an axial direction retaining mechanism 31 by collaborating with the axial direction spacer 30. The axial direction retaining mechanism 31 is installed in a plural number in a circumferential direction. The axial direction retaining belt 20 includes a belt portion 21 having a belt shape, a winding-up portion 22 which winds up the belt portion 21, and installation portions 23 provided in both ends of the belt portion 21. If both of the installation portions 23 are installed in predetermined two positions (actually, in both ends of a mandrel 61 in the axial direction which will be described later) and the belt portion 21 is wound up by the winding-up portion 22 in this state, the axial direction retaining belt 20 can be stretched between the two positions.

The axial direction spacer 30 is a component inserted between the axial direction retaining belt 20 and the mold 10. A plurality of axial direction spacers 30 is inserted between the axial direction retaining belt 20 and the mold 10. When the belt portion 21 of the axial direction retaining belt 20 is wound up and the entire body is fastened tightly, a perpendicular (inward in a radial direction) force is applied to the mold 10 from the axial direction spacer 30 inserted between the mold 10 and the axial direction retaining belt 20 so that the mold 10 is brought into tight contact with the laminate 60. Here, the axial direction spacers 30 mutually differ in height, and the axial direction spacers 30 are arranged in an ascending order of height toward the center of the axial direction retaining belt 20. In this configuration, in the vicinity of the center of the axial direction retaining belt 20 at which it is difficult to apply the force to the mold 10, it is possible to apply a sufficient force to the mold 10, and, as a result, it is possible to uniformly press the mold 10 regardless of positions in the axial direction.

The circumferential direction retaining belt 40 is a component, extending in the circumferential direction of the laminate 60, for bringing the mold 10 into tight contact with the laminate 60, and constitutes a circumferential direction retaining mechanism 51 by collaborating with the circumferential direction spacer 50. The circumferential direction retaining mechanism 51 is installed in a plural number in the axial direction. The circumferential direction retaining belt 40 includes a belt portion 41 having a belt shape and a winding-up portion 42 which winds up the belt portion 41. In the circumferential direction retaining belt 40, the winding-up portion 42 is installed in one end of the belt portion 41, and the other end of the belt portion 41 which goes over the length of the circumferential direction of the laminate 60 is wound up by the winding-up portion 42. Thereby, the entire length of the circumferential direction retaining belt 40 can be tightly fastened.

The circumferential direction spacer 50 is a component inserted between the circumferential direction retaining belt 40 and the mold 10. A plurality of circumferential direction spacers 50 is inserted between the circumferential direction retaining belt 40 and the mold 10. When the belt portion 41 of the circumferential direction retaining belt 40 is wound up and the entire body is tightly fastened, a perpendicular (inward in a radial direction) force is applied to the mold 10 from the circumferential direction spacer 50 inserted between the mold 10 and the circumferential direction retaining belt 40 so that the mold 10 is brought into tight contact with the laminate 60. The circumferential direction spacers 50 are all the same in height.

Described above is the configuration of the molding jig 100 according to the present embodiment. As described above, the mold 10 according to the embodiment has a planar plate shape. Therefore, the mold 10 of the present embodiment can be stored in a standing position (see FIGS. 2 and 3). For example, if a plurality of the molds 10 is stored in a state of being arranged in a space vertically partitioned by partitions, a storage space of the molds can be suppressed to be small. Furthermore, since a cross-sectional shape of the laminate 60 is not a strict circle, there are many cases where portions (portion to cover) of the laminate 60 which correspond to the molds 10 differ in area and shape. Even in this case, each mold 10 has a planar plate shape, and differs in the longitudinal size. Therefore, when a biggest mold 10 is stored as a spare mold, even if any one of the molds 10 is damaged, the mold 10 as the spare mold is cut in conform to the size of the damaged mold 10 and can be used immediately. Thus, in accordance with the mold 10 according to the present embodiment, it is not necessary to prepare a dedicated die for manufacturing each mold 10 and it is possible to suppress the whole manufacturing cost from increasing.

<Molding Method>

Figure 4:
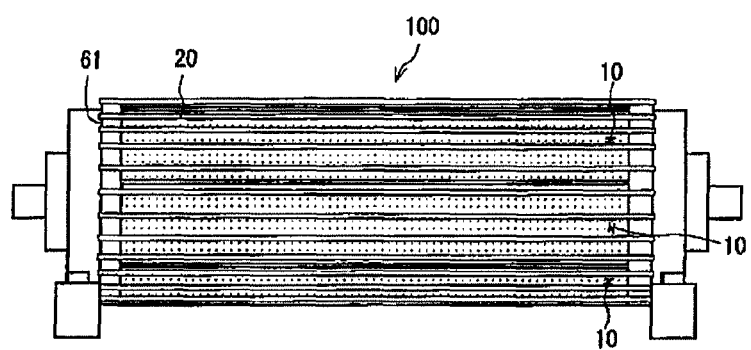
FIG. 4 is a diagram showing a portion of the coating step of the molding method according to the first embodiment of the present invention.
Figure 5:
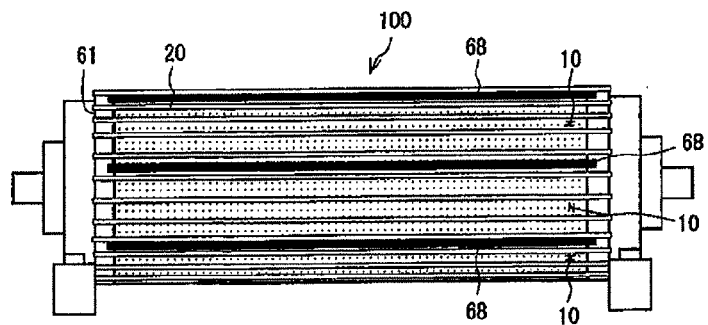
FIG. 5 is a diagram showing a portion of a bagging step of the molding method according to the first embodiment of the present invention.
Figure 6:
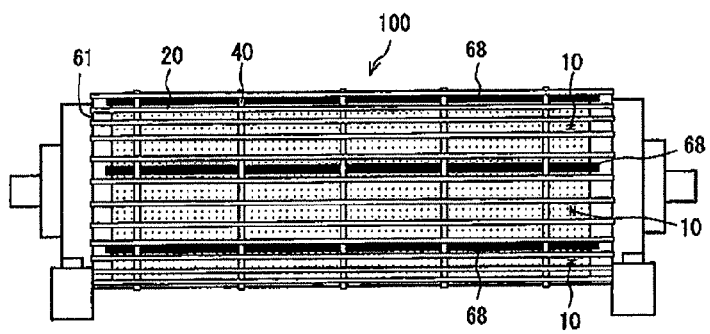
FIG. 6 is a diagram showing a portion of the bagging step of the molding method according to the first embodiment of the present invention.
Figure 7:
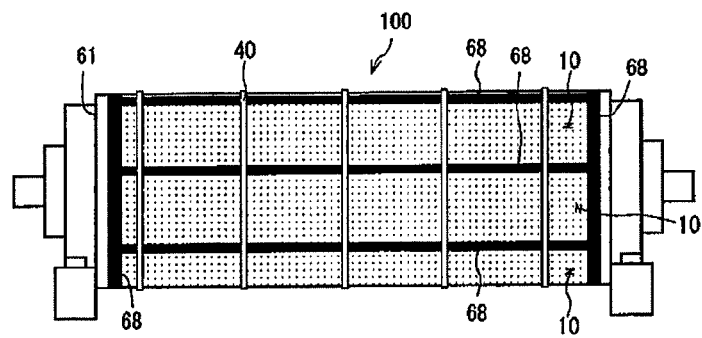
FIG. 7 is a diagram showing a portion of the bagging step of the molding method according to the first embodiment of the present invention.

Next, a molding method according to the present embodiment is described with reference to FIGS. 2 to 7. An object produced by performing molding in accordance with the molding method according to the present embodiment is a skin panel for a fuselage of a large aircraft described above. The molding method according to the present embodiment includes a laminating step, a coating step, a bagging step, a curing step, and a demolding step. Hereinafter, each step is described in order. FIGS. 2 to 4 are diagrams showing the coating step, and FIGS. 5 to 7 are diagrams showing the bagging step. FIGS. 2 and 3 are diagrams (front views) of the mandrel 61 (described below) viewed from an axial direction. FIGS. 4 through 7 are diagrams (side views) viewed from a side of the mandrel 61, and are schematic diagrams in which winding-up portions 22 and 42, etc. are omitted.

The laminating step is a step of forming a laminate by laminating prepreg. First, a cylinder mold (hereinafter, referred to as a "mandrel") 61 which is a core die is used. On a surface of the mandrel 61, a groove (not shown) which extends in an axial direction is formed, and a metal stringer (not shown) is inserted in the groove. The stringer is a bar-like reinforcing member which receives a bending load which acts in an axial direction of a fuselage of an aircraft, and the stringer constitutes a so-called one-piece barrel (OPB) by being integrated with a skin panel. The prepreg 62 is laminated on the surface of the mandrel 61 (as described above, an object obtained by laminating the prepreg is referred to as a "laminate") in a state in which the stringer is buried in the groove of the mandrel 61. The mandrel 61 is configured to be rotatable, and the prepreg 62 is laminated by being wound around the mandrel 61 which is rotating, thereby producing the laminate of an overall cylindrical shape. However, the number of laminated layers is increased depending on positions, thereby adjusting a thickness of the positions. That is, the prepreg 62 is not uniformly laminated in all positions, and there are undulations in the surface of the laminate 60 when the surface is locally viewed.

The coating step is a step of attaching a mold 10 to the laminate 60. First, as shown in FIG. 2, the mold 10 stored in a standing position is extracted from a storage box 63, and the mold 10 is disposed on one side of the laminate 60. The above work is performed by using two sets (only one set is shown in FIG. 2) of hoists 64 and lifting jigs 65 fitted to leading ends of the hoists 64, respectively. The lifting jig 65 is constructed of a bar-like body 66 and a plurality of retaining clamps 67 which can grab the mold 10 provided in the bar-like body 66. And as shown in FIG. 3, the axial direction retaining belt 20 is stretched in two positions, an upper portion and a center portion side of the upper portion, among portions of the mold 10. More specifically, as shown in FIG. 1, after the installation portions 23 of the axial direction retaining belt 20 are installed in both ends of the mandrel 61 in the axial direction, respectively, the belt portion 21 is wound up by the winding-up portion 22, and the axial direction retaining belt 20 is stretched over an outside surface of the mold 10. In this state, the axial direction spacers 30 are inserted between the axial direction retaining belt 20 and the mold 10. In this case, each axial direction spacer 30 is arranged in an ascending order of height toward the center of the axial direction retaining belt 20. The objective of this arrangement is as described above. Then, the belt portion 21 is wound up by the winding-up portion 22 to be tightly fastened.

Then, after removing the lifting jig 65, the mandrel 61 is rotated in a direction (a counterclockwise direction in FIG. 3) in which the mold 10 moves up so that a portion of the mold 10 ranging from the center portion to a lower portion is located on one side of the laminate 60. Since the mold 10 has flexibility, it bends due to its own weight and thus the lower portion thereof approaches the laminate 60. Accordingly, subsequent work becomes easier. And the axial direction retaining belt 20 is stretched in two positions, a lower portion and a center portion side of the lower portion, among the portions of the mold 10, and fastened. Thereby, the mold 10 elastically deforms into a shape corresponding to the shape of the laminate 60, thereby coming into tight contact with the laminate 60. And, as shown in FIG. 4, the above-described work is performed, for a plurality of the molds 10, over the entire circumference of the laminate 60 without interfering with each other (without overlapping each other). As shown in FIGS. 2 and 3, all the work in the coating step is performed from the side of the laminate 60. Thereby, the work in the coating step can be more safely performed compared with a case where work is performed from a top side of the laminate 60. Described above is about the coating step.

The bagging step is a step of entirely covering (i.e., bagging) the mold 10 with a bag film. In the present embodiment, a double bagging method of bagging with a double layer is adopted.

(i) First, in a state in which the mold 10 shown in FIG. 4 is attached to the laminate 60, as shown in FIG. 5, a belt-like bag film 68 is pasted on a boundary portion between adjacent molds 10 in the circumferential direction, thereby covering all the gaps between the molds 10.

(ii) Next, as shown in FIG. 6, the circumferential direction retaining belt 40 is stretched in the circumferential direction of the mold 10 and tightly fastened. At this time, the circumferential direction spacers 50 are inserted between the circumferential direction retaining belt 40 and the mold 10. The circumferential direction retaining belt 40 stretched in the circumferential direction is located inside an inner circumference of the axial direction retaining belt 20 stretched in the axial direction.

(iii) Next, as shown in FIG. 7, the axial direction retaining belt 20 stretched in the axial direction is removed. Since the circumferential direction retaining belt 40 is still pressing the mold even after the axial direction retaining belt 20 is removed, a state in which the mold 10 is in tight contact with the laminate 60 is maintained.

(iv) Next, similarly as shown in FIG. 7, a belt-like bag film 68 is pasted in the circumferential direction so as to cover both of the ends of the mold 10 in the axial direction, thereby covering gaps between both of the ends of the mold 10 in the axial direction and the mandrel 61. Thereby, the laminate 60 is entirely covered by the mold 10 and the bag film 68, and thus sealed.

(v) Next, vacuum suction is performed with respect to the space sealed with the mold 10 and the bag film 68 so that the mold 10 comes into tighter contact with the laminate 60. Thereby, inside bagging (inner bagging) is completed.

(vi) Next, the circumferential direction retaining belt 40 stretched in the circumferential direction is removed. Since vacuum suction is performed with respect to the space sealed with the mold 10 and bag film 68, even through the circumferential direction retaining belt 40 is removed, the state in which the mold 10 is in tight contact with the laminate 60 is maintained.

(vii) Finally, the mold 10 and the mandrel 61 are covered again with a whole bag film (not shown), and vacuum suction is performed with respect to the space between the whole bag film and the mandrel 61. Thereby, outside bagging (outer bagging) is completed. Described above is about the bagging step.

The curing step is a step of curing the laminate. Specifically, the mandrel 61, the laminate 60, and the mold 10 which are collectively bagged through the bagging step are put into an autoclave (high-temperature and high-pressure iron pot) so as to be simultaneously applied with pressure and heat. Thereby, the laminate 60 is cured. Since the mold 10 which comes into tight contact with the laminate 60 restricts deformation of the laminate 60 in the middle of curing, unevenness and undulations existing in the surface of the laminate 60 (skin panel) are removed, providing a smooth surface.

The demolding step is a step of removing the mold 10 from the cured laminate 60 (hereinafter, referred to as a "composite material molded article"). First, after performing the curing step, the composite material molded article is taken out of the autoclave and the bag film of the outside bagging (outer bagging) is removed. Then, each mold 10 is removed from the composite material molded article one by one, using the retaining belt in a reversed order to an installation order of the molds 10. At this time, the mandrel 61 is rotated to be adjusted such that the work of removing the molds 10 is always performed from the side of the mandrel 61. The work of removing the mold 10 is performed in a state in which the mold 10 is hung by a hoist 64. The removed mold 10 undergoes a process of removing foreign matters adhered to the surface in the state in which the removed mold 10 is hung, and a release agent is applied to the surface of the mold 10 in preparation for next work. This work is advantageous in a point that the height of the mold can be lifted and lowered so that a worker can work in a comfortable position.

Described above is about the molding method according to the present embodiment. As described above, in accordance with the molding method according to the present embodiment, when attaching the molds 10 to the laminate 60, it is not necessary to perform installation work in a state of maintaining the mold 10 in a horizontal posture. Furthermore, positioning work is easy because installation work can be performed in a state in which one end of the mold 10 is hung, and a work space can be suppressed to be small. Furthermore, in accordance with the mold 10 according to the present embodiment, it is not necessary to provide a frame member for maintaining the shape of the mold and a lifting portion for horizontally lifting an object, in the mold 10. Therefore, the mold 10 is configured to be light and is easy to handle. Even as for other works such as cleaning and releasing treatment as well as the work of attaching the molds 10, since the works are performed in a state in which one end of the mold 10 is hung, the work can be performed easily.

Second Embodiment

Figure 8:
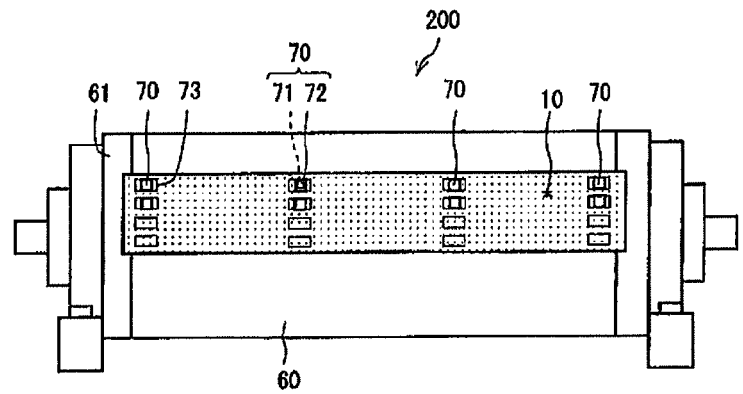
FIG. 8 is a diagram showing a portion of a coating step of a molding method according to a second embodiment of the present invention.
Figure 9:
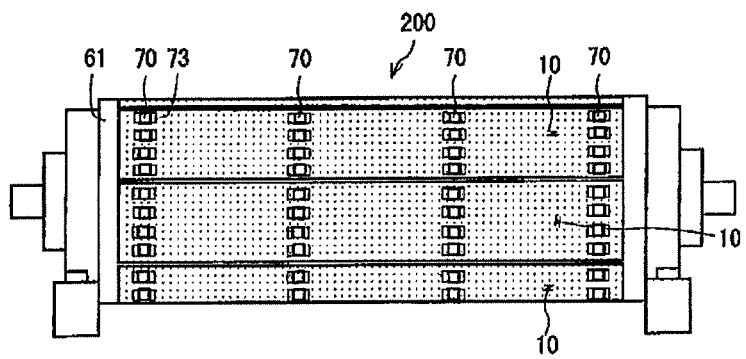
FIG. 9 is a diagram showing a portion of the coating step of the molding method according to the second embodiment of the present invention.
Figure 10:
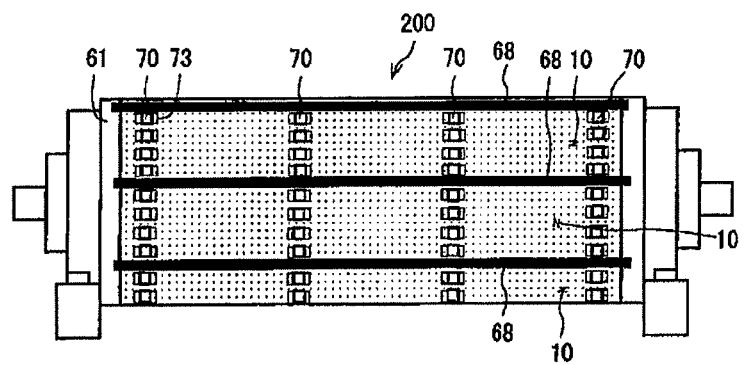
FIG. 10 is a diagram showing a portion of a bagging step of the molding method according to the second embodiment of the present invention.
Figure 11:
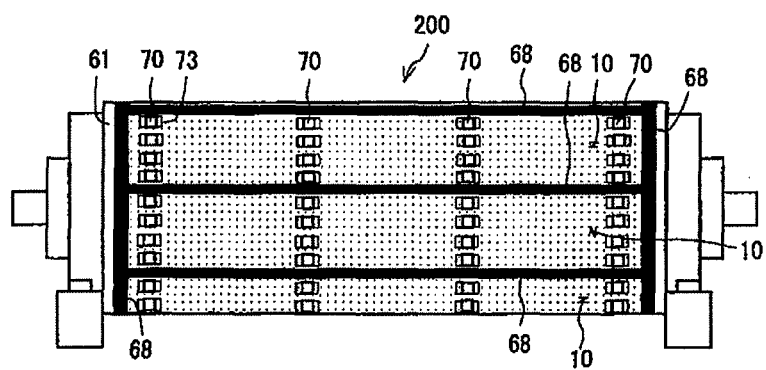
FIG. 11 is a diagram showing a portion of the bagging step of the molding method according to the second embodiment of the present invention.

Next, the configuration of a molding jig 200 according to a second embodiment of the present invention is described with reference to FIGS. 8 to 11. Here, FIGS. 8 through 11 are diagrams (side views) viewed from one side of a mandrel 61. FIGS. 8 and 9 are diagrams showing a portion of a coating step of a molding method according to the present embodiment. FIGS. 10 and 11 are diagrams showing portions of the bagging step of the molding method according to the present embodiment. As described above, the mold 10 is retained with using the axial direction retaining belt 20 and the like in the first embodiment. However, a mold 10 is retained with using a retaining magnet 70 in the present embodiment. That is, the molding jig 200 according to the present embodiment is mainly constructed of the mold 10 and the retaining magnet 70. Hereinafter, the configuration of the retaining magnet 70 and a molding method of the present embodiment are described.

The retaining magnet 70 is a component for bringing the mold 10 into tight contact with a laminate 60. As shown in FIG. 8, the retaining magnet 70 is mainly constructed of a magnet body 71 and a cover member 72. Among these, the magnet body 71 is a magnet itself, may be a permanent magnet, or may be an electromagnet. Although the shape of the magnet body 71 is not particularly limited, but the magnet body 71 of the present embodiment has a rectangular parallelepiped shape. The cover member 72 is configured to cover the entire magnet body 71 except for a surface which constitutes a magnetic pole. In other words, the cover member 72 has an opening and only one surface, which constitutes one magnetic pole, among surfaces of the magnet body 71 covered by the cover member 72, is exposed in the opening. The cover member 72 is made of a material which is not likely to allow transmission of magnetism. Thereby, the retaining magnet 70 can generate strong magnetism only from one surface (i.e., the opening of the cover member 72) (hereinafter, the surface generating strong magnetism is referred to as a "magnetic surface").

Then, the molding method according to the present embodiment is described. The molding method according to the present embodiment includes a laminating step, a coating step, a bagging step, a curing step, and a demolding step in the same manner as the first embodiment. Among these, the laminating step, the curing step, and the demolding step are basically the same as the molding method according to the first embodiment. Therefore, hereinafter, the covering step and the bagging step in the present embodiment are mainly described.

In the coating step according to the present embodiment, first, the mold 10 is located at one side of the laminate 60, and then the retaining magnet 70 is attached to the mold 10. Specifically, as shown in FIG. 8, in positions in height direction (positions in a circumferential direction) in an upper portion and a center portion side of the upper portion among portions of the mold 10, a plurality of the retaining magnets 70 is arranged and installed in an axial direction. At this time, the retaining magnets 70 are installed such that the magnetic surface may face the mold 10. Although the installation order of the retaining magnets 70 is not particularly limited, it is desirable to install the retaining magnets 70 in order from a center portion to an outer portion in the axial direction of the mold 10.

Here, the mandrel 61 (core die) on which the prepreg is laminated is a magnetic body made of an invar alloy, (metal which is an alloy of iron and 34 to 36% of nickel and which is very low in coefficient of thermal expansion), which is a magnetic material. When the mandrel 61 is a magnetic body, since the retaining magnets 70 is absorbed onto the mandrel 61, the mold 10 and the laminate 60 are interposed between the mandrel 61 and the retaining magnet 70. Since the retaining magnets 70 of the present embodiment are configured to generate strong magnetism from only the magnetic surface, it is possible to prevent the adjacent retaining magnets 70 from affecting the magnetism of each other.

In order to increase work efficiency, in the mold 10 of the present embodiment, frame-shaped installation seals 73 are marked in positions to which the retaining magnets 70 are installed. This installation seals 73 are uniformly arranged in the axial direction and the circumferential direction, and retaining magnets 70 are also uniformly installed in the axial direction and the circumferential direction so as to correspond to the installation seals 73. In the present embodiment, unlike the first embodiment, when pressing the mold 10, it is not necessary to take into consideration uniformity of force in positions in the axial direction. Therefore, when the retaining magnets 70 which have the same magnetism on each mold 10 are uniformly arranged in the axial direction and the circumferential direction, the entire mold 10 can be uniformly pressed. In other words, when the retaining magnets 70 are uniformly arranged, the retaining magnets 70 of the same magnetism can be used.

Then, the lifting jig 65 is removed, the mandrel 61 is rotated in the direction in which the mold 10 moves up, and the plurality of retaining magnets 70 is arranged in the axial direction and installed in positions, a lower portion and a center portion side of the lower portion in height direction (circumferential direction) among portions of the mold 10. Thereby, the mold 10 elastically deforms into a shape corresponding to the shape of the laminate 60, thereby coming into tight contact with the laminate 60. And, as shown in FIG. 9, the above-described work is performed, for a plurality of the molds 10, over the entire circumference of the laminate 60 without interfering with each other (without overlapping each other). Described above is about the coating step.

Next, the bagging step according to the present embodiment is described. The bagging step according to the present embodiment is very easy as compared with that of the first embodiment because the axial direction retaining belt 20 and the circumferential direction retaining belt 40 need not be replaced as in the first embodiment. Hereinafter, the bagging step is described specifically.

(i) First, in a state in which the mold 10 is attached to the laminate 60 as shown in FIG. 9, a belt-like bag film 68 is pasted on a boundary portion between adjacent molds 10 in the circumferential direction, thereby covering all the gaps between the molds 10 as shown in FIG. 10.

(ii) Next, similarly as shown in FIG. 11, the belt-like bag film 68 is pasted in the circumferential direction so as to cover both of the ends of the mold 10 in the axial direction, thereby covering gaps between both of the ends of the mold 10 in the axial direction and the mandrel 61. Thereby, the laminate 60 is entirely covered by the mold 10 and the bag film 68, and thus sealed.

(iii) Next, vacuum suction is performed with respect to the space sealed with the mold 10 and the bag film 68 so that the mold 10 comes into tighter contact with the laminate 60. Thereby, inside bagging (inner bagging) is completed.

(iv) Next, all the retaining magnets 70 are removed. Since vacuum suction is performed with respect to the space sealed with the mold 10 and the bag film 68, even after the retaining magnets 70 are removed, a state in which the mold 10 is in tight contact with the laminate 60 is maintained.

(v) Finally, the cover mold 10 and the mandrel 61 are covered again with a whole bag film (not shown), and vacuum suction is performed with respect to the space between the whole bag film and the mandrel 61. Thereby, outside bagging (outer bagging) is completed. Described above is about the bagging step.

Although the demolding step is performed in a reversed order to an installation order of the molds 10 described above, this step also uses the retaining magnets 70 without using the axial direction retaining belt 20 and the like. Described above is about the molding method according to the present embodiment. Thus, when the mandrel 61 is a magnetic body, the retaining magnets 70 can be used as a retaining mechanism for retaining the mold 10. In this case especially the coating step, the bagging step, and the demolding step are easily performed.

As described above, although the embodiments of the present invention have been described with reference to the drawings, concrete configurations thereof are not limited to the embodiments, and changes in design and the like which are made without departing from the spirit of the present invention will fall within the scope of the present invention.

INDUSTRIAL APPLICABILITY

According to the present invention, since a mold which is easy to handle can be provided, it is useful in a technological field of mold.

DESCRIPTION OF REFERENCE SIGNS

10: Mold
20: Axial direction retaining belt
30: Axial direction spacer
31: Axial direction retaining mechanism
40: Circumferential direction retaining belt
50: Circumferential direction spacer
51: Circumferential direction retaining mechanism
60: Laminate
61: Mandrel
62: Prepreg
70: Retaining magnet
100: Molding jig

The invention claimed is:

1. A molding jig comprising:
   a mold used for molding a surface of a laminate when curing the laminate obtained by laminating prepreg; and
   a retaining mechanism that brings the mold into tight contact with the laminate which allows the mold to be covered with a bag film in a state in which the mold is in tight contact with the laminate,
   the mold having a planar plate shape, and elastically deforming from the planar shape into a shape corresponding to a shape of the laminate so as to come into tight contact with the laminate.

2. The molding jig according to claim 1, wherein the mold is made of a fiber-reinforced plastic.

3. The molding jig according to claim 2, wherein the mold has a thickness of 1.5 mm±0.5 mm.

4. The molding jig according to claim 1, wherein the retaining mechanism includes
   a retaining belt which is stretched and fastenable over an outside surface of the mold, and
   a plurality of spacers interposed between the mold and the retaining belt.

5. The molding jig according to claim 4, wherein the plurality of spacers includes spacers which differ in height,
   the laminate has a cylindrical shape, and when the retaining belt is stretched in an axial direction of the laminate, each spacer included in the plurality of spacers is arranged in an ascending order of height toward a center of the retaining belt.

6. The molding jig according to claim 1, wherein the prepreg is laminated on a core die serving as a magnetic body, and the retaining mechanism includes a plurality of retaining magnets that generates magnetism and is attachable to the core die via the mold and the laminate.

7. The molding jig according to claim 6, wherein the retaining magnet is configured to generate strong magnetism only from one surface.

\* \* \* \* \*